United States Patent
Yang et al.

(10) Patent No.: US 11,317,449 B2
(45) Date of Patent: Apr. 26, 2022

(54) DATA TRANSMISSION METHOD AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/619,149

(22) PCT Filed: Sep. 5, 2017

(86) PCT No.: PCT/CN2017/100579
§ 371 (c)(1),
(2) Date: Dec. 4, 2019

(87) PCT Pub. No.: WO2019/047024
PCT Pub. Date: Mar. 14, 2019

(65) Prior Publication Data
US 2020/0146079 A1 May 7, 2020

(51) Int. Cl.
*H04W 76/11* (2018.01)
*H04W 68/06* (2009.01)
(52) U.S. Cl.
CPC ............ *H04W 76/11* (2018.02); *H04W 68/06* (2013.01)
(58) Field of Classification Search
None
See application file for complete search history.

(56) References Cited

U.S. PATENT DOCUMENTS

| 9,113,450 B2 | 8/2015 | Pelletier et al. |
| 2015/0173121 A1 | 6/2015 | Miklós et al. |
| 2018/0270895 A1* | 9/2018 | Park ................ H04W 8/005 |

FOREIGN PATENT DOCUMENTS

| CA | 3057043 | 9/2018 |
| CA | 3072715 | 2/2019 |

(Continued)

OTHER PUBLICATIONS

Federal Service for Intellectual Property of Russia, First Office Action for RU2019140849, dated Sep. 15, 2020.

(Continued)

*Primary Examiner* — Kouroush Mohebbi
(74) *Attorney, Agent, or Firm* — Hodgson Russ LLP

(57) ABSTRACT

Provided are a method for transmitting data and a network device, which are applied to a terminal device in an inactive state, the inactive state referring to that both the terminal device and a first network device retain context information of the terminal device and that the communication connection of the terminal device between the first network device and a core network device is maintained. The method comprises: the first network device sending downlink data for the terminal device to the terminal device by means of a second network device, the first network device being different from the second network device. With the method of the embodiments of the present invention, the downlink data is sent by means of the second network device, which may effectively improve the success rate of data transmission and improve the user experience.

17 Claims, 5 Drawing Sheets

(56) References Cited

FOREIGN PATENT DOCUMENTS

| CN | 101043705 | | 9/2007 |
|----|-----------|---|--------|
| CN | 103338500 | | 10/2013 |
| CN | 103906262 | A | 7/2014 |
| EP | 2557889 | A1 | 2/2013 |
| EP | 3018963 | A1 | 5/2016 |
| EP | 3337286 | | 6/2018 |
| EP | 3570584 | | 11/2019 |
| EP | 3611996 | | 2/2020 |
| JP | 2017108447 | | 6/2017 |
| RU | 2503147 | C2 | 12/2013 |
| RU | 2603626 | C2 | 11/2016 |
| WO | 2017045149 | | 3/2017 |

OTHER PUBLICATIONS

EPO, Office Action for EP Application No. 17924710.1, dated Apr. 24, 2020.
WIPO, ISR for PCT/CN2017/100579, May 30, 2018.
CMCC, "Paging Failure Handling in RRC_INACTIVE," 3GPP TSG-RAN WG2 Meeting #99, R2-1708990, Aug. 2017, 2 pages.
ISDEC, Office Action for CA Application No. 3064305, dated Jan. 13, 2021.
IPI, Office Action for IN Application No. 201917050623, dated Jan. 22, 2021.
KIPO, Office Action for KR Application No. 10-2019-7034084, dated Apr. 28, 2021.
JPO, Office Action for JP Application No. 2019-563767, dated Jul. 2, 2021.
Lenovo, Motorola Mobility, "23.502: Persistent RAN paging failure handling procedure," SA WG2 Meeting # 122bis, S2-175932, Aug. 2017.
Ericsson, "RRC state machine and RRC_INACTIVE characteristics," 3GPP TSG-RAN WG2 adhoc, Tdoc R2-1700535, Jan. 2017.
OPPO, "TS 23.501: RAN Paging Failure Handling for Inactive State," SA WG2 Meeting #122bis, S2-175527, Aug. 2017.
CIPO, Office Action issued for CA Application No. 3,064,305, dated Dec. 1, 2021.
KIPO, Office Action issued for KR Application No. 10-2019-7034084, dated Oct. 22, 2021.
TIPO, Office Action issued for TW Application No. 107131162, dated Sep. 30, 2021.
JPO, Office Action for JP Application No. 2019-563767, dated Feb. 22, 2022.

\* cited by examiner

DATA TRANSMISSION METHOD AND NETWORK DEVICE

CROSS-REFERENCE TO RELATED APPLICATION

This application is a U.S. national phase application of International Application No. PCT/CN2017/100579, filed Sep. 5, 2017, the entire disclosure of which is incorporated herein by reference.

TECHNICAL FIELD

Embodiments of the present disclosure relate to the field of communications, and more particularly, to a method for transmitting data and a network device.

BACKGROUND

People pursue speed, delay, high-speed mobility and energy efficiency, and service in the future has diversity and complexity.

To this end, the 3rd Generation Partnership Project (3GPP) International Standard Organization began to develop the fifth generation of mobile communication technology (5-Generation, 5G). The main application scenarios of 5G are: Enhance Mobile Broadband (eMBB), Ultra-Reliable and Low Latency Communication (URLLC), and massive Machine Type of Communication (mMTC).

Among them, the typical application scenarios of URLLC include: industrial automation, power automation, telemedicine operation (surgery), traffic safety and so on. The URLLC-type service has a high latency requirement, and it is important to establish an RRC connection quickly, and then to send the service data.

In the 5G network environment, in order to reduce air interface signaling and quickly recover a wireless connection, and to quickly recover data services, a new Radio Resource Control (RRC) state, that is, a radio resource control inactive (RRC_INACTIVE) state, is defined. In other words, when the terminal device is in the RRC_INACTIVE state, if downlink data arrives, the core network may send data to a network device (for example, a base station), and the network device triggers a paging message to the terminal device to evoke the terminal device to enter the connection state to receive data.

However, when the paging message of the network device fails to be sent, the process will fall back to use the core network to send a paging message. At this time, the terminal device may re-initiate the connection and performs service reception. This transmission mechanism will result in loss of data left in the original network device, reducing the success rate of data transmission and user experience.

SUMMARY

A method for transmitting data and a network device are provided, which can effectively improve the success rate of data transmission and the user experience.

In a first aspect, there is provided a method for transmitting data, which is applied to a terminal device in an inactive state, where the inactive state means that the terminal device and a first network device both reserve context information of the terminal device, and a communication connection of the terminal device is reserved between the first network device and a core network device;

the method includes:

sending, by the first network device, downlink data of the terminal device to the terminal device via a second network device, the first network device being different from the second network device.

The method of the embodiments of the present disclosure can effectively improve the success rate of data transmission and the user experience.

In some possible implementation manners, the sending, by the first network device, the downlink data of the terminal device to the terminal device via the second network device includes:

when the first network device receives the downlink data sent by the core network device and fails to send a first paging message to the terminal device, sending, by the first network device, the downlink data to the terminal device via the second network device.

In some possible implementation manners, before sending, by the first network device, the downlink data of the terminal device to the terminal device via the second network device, the method further includes:

forwarding, by the first network device, the downlink data to the second network device via a first tunnel; and wherein the first tunnel is a tunnel established by the second network device from the first network device to the second network device.

The method of the embodiments of the present disclosure can effectively improve the success rate of data transmission and the user experience by establishing the first tunnel.

In some possible implementation manners, the first tunnel is established by the second network device according to identifier information of the first network device and first indication information that are sent by the core network device, and the first indication information is used to indicate the second network device to establish the first tunnel.

In some possible implementation manners, before forwarding, by the first network device, the downlink data to the second network device via the first tunnel, the method further includes:

sending, by the first network device, second indication information to the core network device, wherein the second indication information is used by the core network device to reserve the first context information, and the communication connection of the terminal device between the first network device and the core network device.

In some possible implementation manners, the sending, by the first network device, the second indication information to the core network device includes:

sending, by the first network device, a paging request message to the core network device, wherein the paging request message is used to request the core network device to send a second paging message to the terminal device, and the paging request message includes the second indication information.

In some possible implementation manners, the sending, by the first network device, the downlink data of the terminal device to the terminal device via the second network device includes:

forwarding, by the first network device, the downlink data to the core network device by using a second tunnel, so that the core network device forwards the downlink data to the second network device by using a third tunnel; wherein the second tunnel is a tunnel established by the core network device from the first network device to the core network device, and the third tunnel is a tunnel established by the second network device from the core network device to the second network device.

The method of the embodiments of the present disclosure can effectively improve the success rate of data transmission and the user experience by establishing the second tunnel and the third tunnel.

In some possible implementation manners, the second tunnel is established by the core network device according to third indication information sent by the first network device, and the third indication information is used to indicate the core network device to establish the second tunnel.

In some possible implementation manners, the third indication information is further configured to indicate the core network device to reserve the first context information, and the communication connection of the terminal device between the first network device and the core network device.

In some possible implementation manners, before forwarding, by the first network device, the downlink data to the core network device via the second tunnel, the method further includes:

sending, by the first network device, the third indication information to the core network device.

In some possible implementation manners, the sending, by the first network device, the third indication information to the core network device includes:

sending, by the first network device, a paging request message to the core network device, wherein the paging request message is used to request the core network device to send a second paging message to the terminal device, and the paging request message includes the third indication information.

In some possible implementation manners, the third tunnel is established by the second network device according to fourth indication information sent by the core network device, and the fourth indication information is used to indicate the second network device to establish the third tunnel.

In some possible implementation manners, the sending, by the first network device, the downlink data of the terminal device to the terminal device via the second network device includes:

when the first network device receives the downlink data sent by the core network device, and receives fifth indication information sent by the second network device, sending, by the first network device, the downlink data to the terminal device via the second network device, wherein the fifth indication information is used to indicate the second network device to establish a first tunnel for the first network device to forward the downlink data to the second network device.

In some possible implementation manners, before sending, by the first network device, the downlink data of the terminal device to the terminal device via the second network device, the method further includes:

receiving, by the first network device, a context request message sent by the second network device, wherein the context request message is used to request the first context information, and the context request message includes the fifth indication information.

In some possible implementation manners, the method further includes:

receiving, by the first network device, notification information sent by the core network device, wherein the notification information is used to notify the first network device to release first context information, and the communication connection of the terminal device between the first network device and the core network device.

In a second aspect, there is provided a method for transmitting data, which is applied to a terminal device in an inactive state, wherein the inactive state means that the terminal device and a first network device both reserve context information of the terminal device, and a communication connection of the terminal device is reserved between the first network device and a core network device;

wherein the method includes:

receiving, by a second network device, downlink data of the terminal device, wherein the first network device is different from the second network device; and sending, by the second network device, the downlink data to the terminal device.

In some possible implementation manners, before receiving, by the second network device, the downlink data of the terminal device, the method further includes:

establishing, by the second network device, a first tunnel, wherein the first tunnel is a tunnel from the first network device to the second network device; and wherein the receiving, by the second network device, the downlink data of the terminal device, includes:

receiving, by the second network device, the downlink data sent by the first network device by using the first tunnel.

In some possible implementation manners, before establishing, by the second network device, the first tunnel, the method further includes:

receiving, by the second network device, first indication information sent by the core network device, wherein the first indication information is used to indicate the second network device to establish the first tunnel.

In some possible implementation manners, the receiving, by the second network device, the first indication information sent by the core network device includes:

receiving, by the second network device, a context establishment request message sent by the core network device, wherein the context establishment request message is used to request the second network device to establish second context information of the terminal device, and the context establishment request message includes the first indication information.

In some possible implementation manners, before receiving, by the second network device, the downlink data of the terminal device, the method further includes:

establishing, by the second network device, a third tunnel, wherein the third tunnel is a tunnel from the core network device to the second network device; and wherein the receiving, by the second network device, the downlink data of the terminal device includes:

receiving, by the second network device, the downlink data sent by the core network device via the third tunnel.

In some possible implementation manners, before establishing, by the second network device, the third tunnel, the method further includes:

receiving, by the second network device, fourth indication information sent by the core network device, wherein the fourth indication information is used to indicate the second network device to establish the third tunnel.

In some possible implementation manners, the receiving, by the second network device, the fourth indication information sent by the core network device includes:

receiving, by the second network device, a context establishment request message sent by the core network device, wherein the context establishment request message is used to request the second network device to establish second context information of the terminal device, and the context establishment request message includes the fourth indication information.

In some possible implementation manners, before receiving, by the second network device, the downlink data of the terminal device, the method further includes:

sending, by the second network device, fifth indication information to the first network device, wherein the fifth indication information is used to indicate the second network device to establish a first tunnel for the first network device to forward the downlink data to the second network device.

In some possible implementation manners, the sending, by the second network device, the fifth indication information to the first network device includes:

sending, by the second network device, a context request message to the first network device, wherein the context request message is used to request the first context information, and the context request message includes the fifth indication information.

In some possible implementation manners, the method further includes:

establishing, by the second network device and the terminal device, a radio resource control (RRC) connection between the second network device and the terminal device.

In a third aspect, there is provided a method for transmitting data, applied in a terminal device in an inactive state, wherein the inactive state means that the terminal device and a first network device both reserve context information of the terminal device, and a communication connection of the terminal device is reserved between the first network device and a core network device;

wherein the method includes:

forwarding, by the core network device, downlink data of the terminal device to a second network device via the first network device, so that the second network device sends the downlink data to the terminal device, the first network device being different from the second network device.

In some possible implementation manners, before forwarding, by the core network device, the downlink data of the terminal device to the second network device via the first network device, the method further includes:

sending, by the core network device, first indication information to the second network device, wherein the first indication information is used to indicate the second network device to establish a first tunnel, and the first tunnel is used for the first network device to forward the downlink data to the second network device.

In some possible implementation manners, before forwarding, by the core network device, the downlink data of the terminal device to the second network device via the first network device, the method further includes:

receiving, by the core network device, second indication information sent by the first network device, wherein the second indication information is used to indicate the core network device to reserve the first context information, and the communication connection of the terminal device between the first network device and the core network device.

In some possible implementation manners, the receiving, by the core network device, the second indication information sent by the first network device includes:

receiving, by the core network device, a paging request message sent by the first network device, wherein the paging request message is used to request the core network device to send a second paging message to the terminal device, and the paging request message includes the second indication information.

In some possible implementation manners, before forwarding, by the core network device, the downlink data of the terminal device to the second network device via the first network device, the method further includes:

establishing, by the core network device, a second tunnel, wherein the second tunnel is a tunnel from the first network device to the core network device; and the forwarding, by the core network device, the downlink data of the terminal device to the second network device via the first network device includes:

receiving, by the core network device, the downlink data sent by the first network device by using the second tunnel, so that the core network device sends the downlink data to the second network device by using the third tunnel, wherein the third tunnel is a tunnel established by the second network device from the core network device to the second network device.

In some possible implementation manners, before establishing, by the core network device, the second tunnel, the method further includes:

receiving, by the core network device, third indication information sent by the first network device, wherein the third indication information is used to indicate the core network device to establish the second tunnel.

In some possible implementation manners, the third indication information is further configured to indicate the core network device to reserve the first context information, and the communication connection of the terminal device between the first network device and the core network device.

In some possible implementation manners, the receiving, by the core network device, the third indication information sent by the first network device includes:

receiving, by the core network device, a paging request message sent by the first network device, wherein the paging request message is used to request the core network device to send a second paging message to the terminal device, wherein the paging request message includes the third indication information.

In some possible implementation manners, before establishing, by the core network device, the third tunnel, the method further includes:

sending, by the core network device, fourth indication information to the second network device, wherein the fourth indication information is used to indicate the second network device to establish the third tunnel.

In some possible implementation manners, the sending, by the core network device, the fourth indication information to the second network device includes:

sending, by the core network device, a context establishment request message to the second network device, wherein the context establishment request message is used to request the second network device to establish second context information of the terminal device, and the context establishment request message includes the fourth indication information.

In some possible implementation manners, the method further includes:

sending, by the core network device, notification information to the first network device, wherein the notification information is used to notify the first network device to release first context information, and the communication connection of the terminal device between the first network device and the core network device.

In a fourth aspect, there is provided a network device, including:

a transceiver unit, configured to send downlink data of a terminal device to the terminal device via a second network device, wherein the terminal device is in an inactive state, the inactive state means that the terminal device and a network device both reserve context information of the terminal device, a communication connection of the terminal device is reserved between the network device and the core network device, and the network device is different from the second network device.

In a fifth aspect, there is provided a network device, including:

a transceiver unit, configured to receive downlink data of a terminal device, and send the downlink data to the terminal device; wherein the terminal device is in an inactive state, the inactive state means that the terminal device and a first network device both reserve context information of the terminal device, and a communication connection of the terminal device is reserved between the first network device and the core network device, and the first network device is different from the network device In a sixth aspect, there is provided a network device, including:

a transceiver unit, configured to receive downlink data of a terminal device, and send the downlink data to the terminal device;

wherein the terminal device is in an inactive state, the inactive state means that the terminal device and a first network device both reserve context information of the terminal device, and a communication connection of the terminal device is reserved between the first network device and the core network device, and the first network device is different from the network device.

In a seventh aspect, there is provided a network device, including:

a transceiver, configured to receive downlink data of a terminal device, and send the downlink data to the terminal device;

wherein the terminal device is in an inactive state, the inactive state means that the terminal device and a first network device both reserve context information of the terminal device, and a communication connection of the terminal device is reserved between the first network device and the core network device, and the first network device is different from the network device.

In an eighth aspect, there is provided a network device, including:

a transceiver unit, configured to forward downlink data of a terminal device to a second network device via a first network device, so that the second network device sends the downlink data to the terminal device, wherein the terminal device is in an inactive state, the inactive state means that the terminal device and the first network device both reserve context information of the terminal device, a the communication connection of the terminal device is reserved between the first network device and the network device, and the first network device is different from the second network device.

In a ninth aspect, there is provided a network device, including:

a transceiver, configured to forward downlink data of a terminal device to a second network device via a first network device, so that the second network device sends the downlink data to the terminal device, wherein the terminal device is in an inactive state, the inactive state means that the terminal device and the first network device both reserve context information of the terminal device, a the communication connection of the terminal device is reserved between the first network device and the network device, and the first network device is different from the second network device.

In a tenth aspect, there is provided a computer readable medium for storing a computer program, and the computer program includes instructions for performing the method embodiment of the first aspect or the second aspect or the third aspect described above.

In an eleventh aspect, there is provided a computer chip, including: an input interface, an output interface, at least one processor, and a memory, wherein the processor is configured to execute code in the memory, and when the code is executed, the processor may implement the various processes performed by the network device in the method of the first aspect or the second aspect or the third aspect described above.

In a twelfth aspect, there is provided a communication system including the network device as described above.

DETAILED DESCRIPTION

Figure 1:
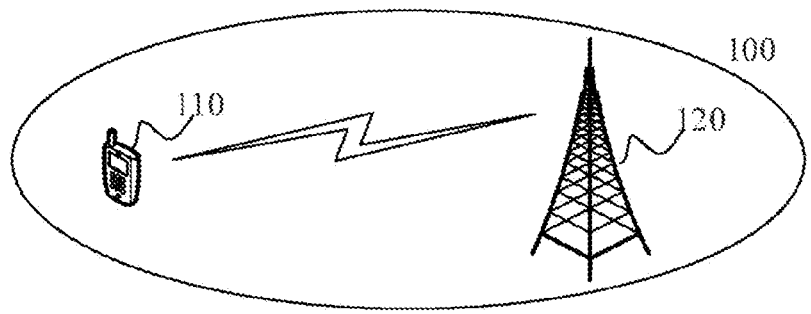
FIG. 1 is an example of an application scenario of an embodiment of the present disclosure.

FIG. 1 is a schematic diagram of a communication system according to an embodiment of the present disclosure.

As shown in FIG. 1, a communication system 100 may include a terminal device 110 and a network device 120. The network device 120 may communicate with the terminal device 110 over an air interface. Multi-service transmission is supported between the terminal device 110 and the network device 120. The terminal device 110 may be in an RRC_INACTIVE state.

The RRC_INACTIVE state is different from the radio resource control idle (RRC_IDLE) state and the radio resource control active (RRC_ACTIVE) state. To facilitate the understanding of the solution, a brief introduction is made to the terminal device in the RRC_INACTIVE state.

Specifically, for the RRC_IDLE state, there is no RRC connection between the terminal device and the network device, and the network device does not store context information of the terminal device. When the terminal device needs to be paged, paging is initiated by the core network, and the paging area is configured by the core network. Its mobility is based on cell selection or cell reselection of the terminal device. For the RRC_ACTIVE state, there is an RRC connection between the terminal device and the network device, and the network device and the terminal device store the context information of the terminal device. The location of the terminal device acquired by the network device is at a specific cell level. Its mobility is a mobility controlled by the network device.

However, for the RRC_INACTIVE state, there is a connection between the core network (CN) and the network device, the context information of the terminal device exists on a certain network device, the paging is triggered by the Radio Access Network (RAN), and the paging area of the RAN is managed by the RAN, that is, the location of the terminal device acquired by the network device is at a paging area level of the RAN. Its mobility is based on cell selection or cell reselection of the terminal device. In other words, the connection between the terminal device in the RRC_INACTIVE state and the network device is in a disconnected state, the network device retains the context information of the terminal device, and the context information is used to quickly establish the connection between the terminal device and the network device.

For example, assuming that the terminal device is in the RRC_INACTIVE state, the network device configures the terminal device with the paging area of the RAN, and the paging area of the RAN may include multiple cells. That is, when performing cell reselection, the terminal device may trigger the terminal device to resume the RRC connection based on the paging area of the RAN.

Specifically, when the terminal device performs cell reselection, if the terminal device moves within the paging area of the RAN, the network device is not notified, and more specifically, the terminal device may follow the mobility behavior under RRC_IDLE, that is, follow the cell selection reselection principle under RRC_IDLE to perform cell reselection. If the terminal device moves out of the paging area of the RAN, the terminal device may be triggered to resume the RRC connection and re-acquire the paging area configured by the network device.

In other words, when downlink data arrives the terminal device, the network device that maintains the connection between the RAN and the CN for the terminal device may trigger all cells in the RAN paging area to send a paging message to the terminal device, so that the terminal device in the RRC_INACTIVE state may restore the RRC connection and perform data reception. When uplink data arrives, the terminal device triggers a random access procedure and accesses the network for data sending.

However, when the first network device fails to send the first paging message, it will return to that the core network sends a second paging message to the terminal device.

Figure 2:
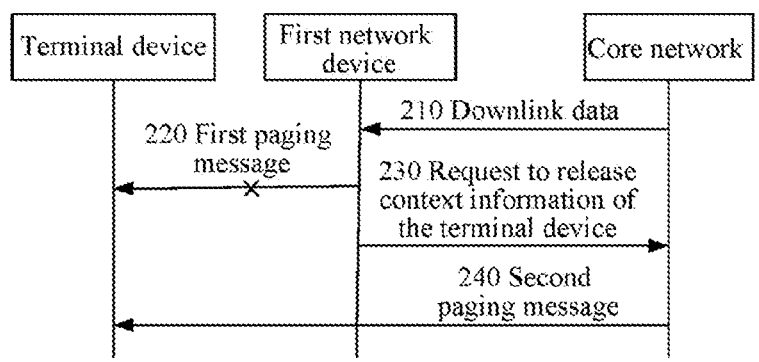
FIG. 2 is a flow chart of a method for transmitting data in the related art.

Specifically, as shown in FIG. 2, the process includes the following steps.

In 210, the core network sends downlink data to the first network device.

In 220, the first network device fails to send the first paging message.

In 230, the first network device requests the core network to release context information of the terminal device.

In 240, the core network sends a second paging message to the terminal device.

At this point, the terminal device may re-initiate the connection and receive the service. This transmission mechanism will result in loss of data left in the original network device, reducing the success rate of data transmission and user experience.

In the embodiments of the present disclosure, a method for transmitting data is provided. The network side indicates to establish a tunnel for forwarding the downlink data to forward the downlink data, thereby preventing data loss, maintaining service integrity, and improving user experience.

It should be understood that the embodiments of the present disclosure are applicable to any communication system including a terminal device in an RRC_INACTIVE state. That is, the embodiments of the present disclosure are exemplified only by the communication system 100, but the embodiments of the present disclosure are not limited thereto. That is, the technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, LTE Time Division Duplex (TDD), a Universal Mobile Telecommunication System (UMTS) and the like.

The present disclosure describes various embodiments in connection with the network device and the terminal device.

The network device 120 may refer to any entity on the network side that is used to send or receive signals. For example, it may be a user equipment of a machine type communication (MTC), a base station (Base Transceiver Station, BTS) in GSM or CDMA, a base station (NodeB) in WCDMA, an evolved base station (Evolutional Node B, eNB or eNodeB) in LTE, a base station equipment in a 5G network, and the like.

Further, the terminal device 110 may be any terminal device. Specifically, the terminal device 110 may communicate with one or more core networks (Core Networks) via a Radio Access Network (RAN), and may also be referred to as an access terminal, a user equipment (User Equipment, UE), a subscriber unit, a subscriber station, a mobile station, a mobile stage, a remote station, a remote terminal, a mobile device, a user terminal, a terminal, a wireless communication device, a user agent or a user device. For example, it may be a cellular phone, a cordless phone, a Session Initiation Protocol (SIP) phone, a Wireless Local Loop (WLL) station, a Personal Digital Assistant (PDA), and a handheld device with a wireless communication function, a computing device or other processing devices connected to a wireless modem, an in-vehicle device, a wearable device, and a terminal device in 5G network, and the like.

The implementation manner of the method for cell reselection in the embodiments of the present disclosure is specifically described below.

Figure 3:
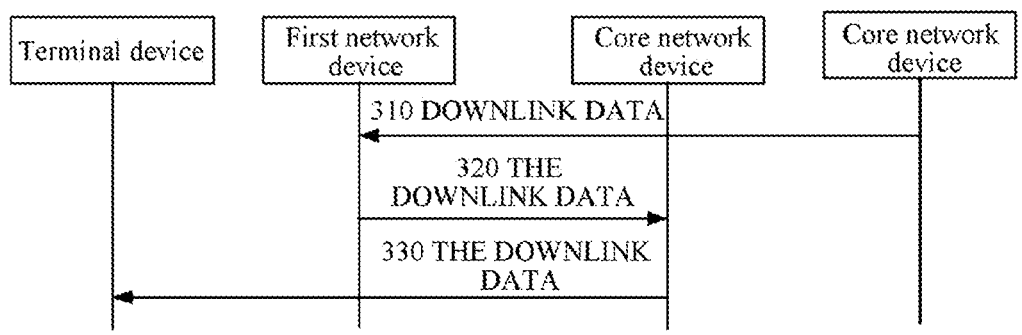
FIG. 3 is a flow chart of a method for transmitting data according to an embodiment of the present disclosure.

FIG. 3 is a schematic flow chart of a method 300 for transmitting data according to an embodiment of the present disclosure.

As described in FIG. 3, the method includes the following steps.

In 310, the core network device sends downlink data of the terminal device to the first network device.

In 320, the first network device forwards the downlink data to the second network device.

In 330, the second network device sends the downlink data to the terminal device.

It should be understood that the method for transmitting data in the embodiments of the present disclosure may be applied to a terminal device in an inactive state, where the inactive state indicates that both the terminal device and the first network device retain context information of the terminal device, and a communication connection of the terminal device is retained between the first network device and the core network device.

Specifically, the method includes the following steps.

The first network device sends downlink data of the terminal device to the terminal device via the second network device, where the first network device is different from the second network device. In other words, the second network device receives the downlink data of the terminal device; and the second network device sends the downlink data to the terminal device.

It should be noted that the terms "first network device" and "second network device" employed in the embodiments of the present disclosure are only used to distinguish the network devices from each other, and should not limit the scope of the embodiments of the present disclosure. For example, the difference between the first network device and the second network device may refer to not being the same network device or the like.

In an embodiment, when the first network device receives the downlink data sent by the core network device, and fails to send the first paging message to the terminal device, the first network device sends the downlink data to the terminal device via the second network device.

Optionally, before the first network device sends the downlink data of the terminal device to the terminal device via the second network device, the first network device forwards the downlink data to the second network device by using a first tunnel; where the first tunnel is a tunnel established by the second network device from the first network device to the second network device.

In other words, before the second network device receives the downlink data of the terminal device, the second network device establishes a first tunnel, and the second network device receives the downlink data sent by the first network device by using the first tunnel.

In the embodiments of the present disclosure, the first tunnel is established by the second network device according to identifier information of the first network device and first indication information that are sent by the core network device, where the first indication information is used to indicate the second network to establish the first tunnel.

In other words, before the second network device establishes the first tunnel, the second network device receives the first indication information sent by the core network device. For example, the second network device receives a context establishment request message sent by the core network device, where the context establishment request message is used to request the second network device to establish second context information of the terminal device, and the context establishment request message includes the first indication information.

That is, before the core network device forwards the downlink data of the terminal device to the second network device, the core network device sends the first indication information to the second network device.

Further, before the first network device forwards the downlink data to the second network device by using the first tunnel, the first network device sends second indication information to the core network device, where the second indication information is used for the core network device to reserve the first context information and the communication connection of the terminal device between the first network device and the core network device. In other words, before forwarding the downlink data of the terminal device to the second network device via the first network device, the core network device may receive the second indication information sent by the first network device.

For example, the first network device sends a paging request message to the core network device, where the paging request message is used to request the core network device to send a second paging message to the terminal device, and the paging request message includes the second indication information.

Figure 4:
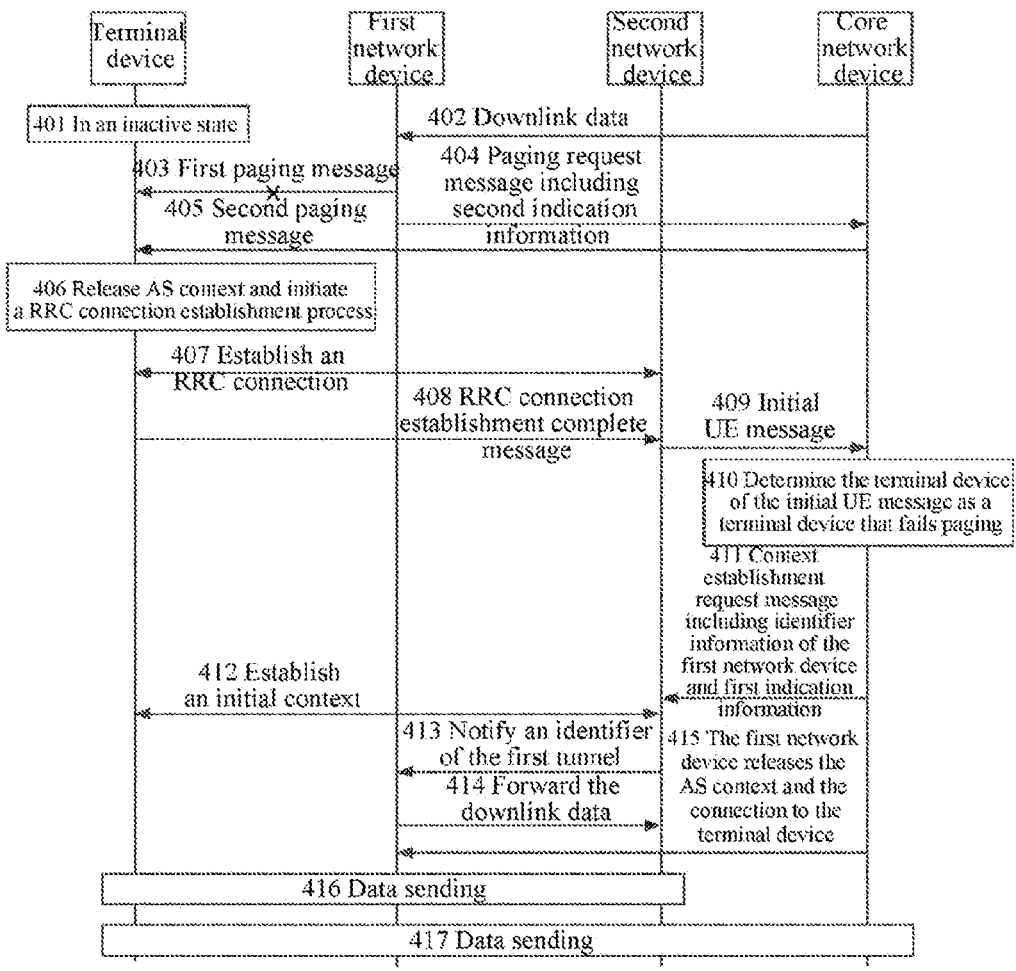
FIG. 4 is another flow chart of a method for transmitting data according to an embodiment of the present disclosure.

FIG. 4 is another schematic flowchart of a method for transmitting data according to an embodiment of the present disclosure.

Specifically, as shown in FIG. 4, the method includes the following steps.

In 401, the terminal device is in an activated state.

In 402, the core network device sends downlink data of the terminal device to the first network device.

In 403, the first network device fails to send a first paging message to the terminal device.

In 404, the first network device sends a paging request message including second indication information to the core network device, where the second indication information is used by the core network device to reserve the first context information, and the communication connection of the terminal device between the first network device and the core network device.

In 405, the core network device sends a second paging message to the terminal device.

In 406, the terminal device releases an access stratum (AS) context and initiates a Radio Resource Control (RRC) connection establishment process.

In 407, the terminal device establishes an RRC connection with the second network device.

In 408, the terminal device sends an RRC connection establishment complete message to the second network device.

In 409, the second network device sends an initial user equipment (UE) message to the core network device.

In 410, the core network device determines that the terminal device of the initial UE message is a terminal device that fails paging.

In 411, the core network device sends a context establishment request message (INITIAL CONTEXT SETUP REQUEST) to the second network device, where the context establishment request message includes identifier information of the first network device and first indication information, and the first indication information is used to indicate the second network device to establish the first tunnel.

In 412, the second network device establishes an initial context of the terminal device.

In 413, the second network device establishes a first tunnel, and notifies the first network device of an identifier of the first tunnel.

In 414, the first network device forwards the downlink data to the second network device on the first tunnel.

In 415, the first network device releases the access stratum (AS) context and the connection to the terminal device.

In 416, data transmission is performed between the second network device and the terminal device.

In 417, data transmission is performed between the core network device and the terminal device.

In summary, when the terminal device in the inactive state has the downlink data reaching the first network device, the first network device is triggered to initiate the RAN initial paging message. When the RAN initial paging message fails to page the UE, the first network device initiates to the core network device, an initial paging message request for the core network device with respect to UE, and instructs the core network device to temporarily save the connection of the UE in the NG/S1 and AS context request. The core network device initiates a paging message to the UE. After receiving the initial paging message of the core network device, the terminal device releases the UE AS context stored by the UE before, and initiates an RRC connection establishment process. When the core network device receives the initial UE message and identifies that the current UE is the UE requested by RAN to initiate the initial network paging message of the core network device, it is indicated in the initial context message to the second network device, ID information about the first network device and initiating the GPRS Tunneling Protocol (GTP) tunnel establishment to a given base station corresponding to the ID of the first network device, so that the first network device initiates a data forwarding process to the second network device. The second network device initiates the GTP tunnel establishment process to the base station corresponding to the ID of the given first network device, and performs data forwarding. After the data forwarding is completed, the first network device ID initiates a UE connection release and context release process to the core network device. The second network device first sends the data forwarded from the first network device ID and then sends the data transmitted from the core network device.

Optionally, the first network device forwards the downlink data to the core network device by using the second tunnel, so that the core network device forwards the downlink data to the second network device by using the third tunnel, where the second tunnel is a tunnel established by the core network device from the first network device to the core network device, and the third tunnel is a tunnel established by the second network device between the core network device and the second network device.

In other words, before the core network device forwards the downlink data of the terminal device to the second network device via the first network device, the core network device establishes a second tunnel; and the core network device receives the downlink data sent by the first network device by using the second tunnel, so that the core network device sends the downlink data to the second network device by using the third tunnel.

Similarly, before the second network device receives the downlink data of the terminal device, the second network device establishes a third tunnel, and the second network device receives the downlink data sent by the core network device by using the third tunnel.

Therefore, the downlink data is sent to the terminal device by the second network device.

The second tunnel in the embodiments of the present disclosure is established by the core network device according to third indication information sent by the first network device, where the third indication information is used to instruct the core network device to establish the second tunnel. In other words, the core network device receives the third indication information sent by the first network device before establishing the second tunnel, and establishes the second tunnel according to the third indication information.

Further, the third indication information is further configured to instruct the core network device to reserve the first context information, and the communication connection of the terminal device between the first network device and the core network device.

In an actual implementation, before the first network device forwards the downlink data to the core network device by using the second tunnel, the first network device sends the third indication information to the core network device.

For example, the first network device sends a paging request message to the core network device, where the paging request message is used to request the core network device to send a second paging message to the terminal device, and the paging request message includes the third indication information.

The third tunnel in the embodiments of the present disclosure is established by the second network device according to fourth indication information sent by the core network device, where the fourth indication information is used to indicate the second network device to establish the third tunnel.

In other words, before the core network device establishes the third tunnel, the fourth indication information is sent to the second network device. In this way, before the third tunnel is established, the second network device can receive the fourth indication information sent by the core network device, and establish the third tunnel according to the fourth indication information.

For example, the second network device receives a context establishment request message sent by the core network device, where the context establishment request message is used to request the second network device to establish second context information of the terminal device, and the context establishment request message includes the fourth indication information.

Figure 5:
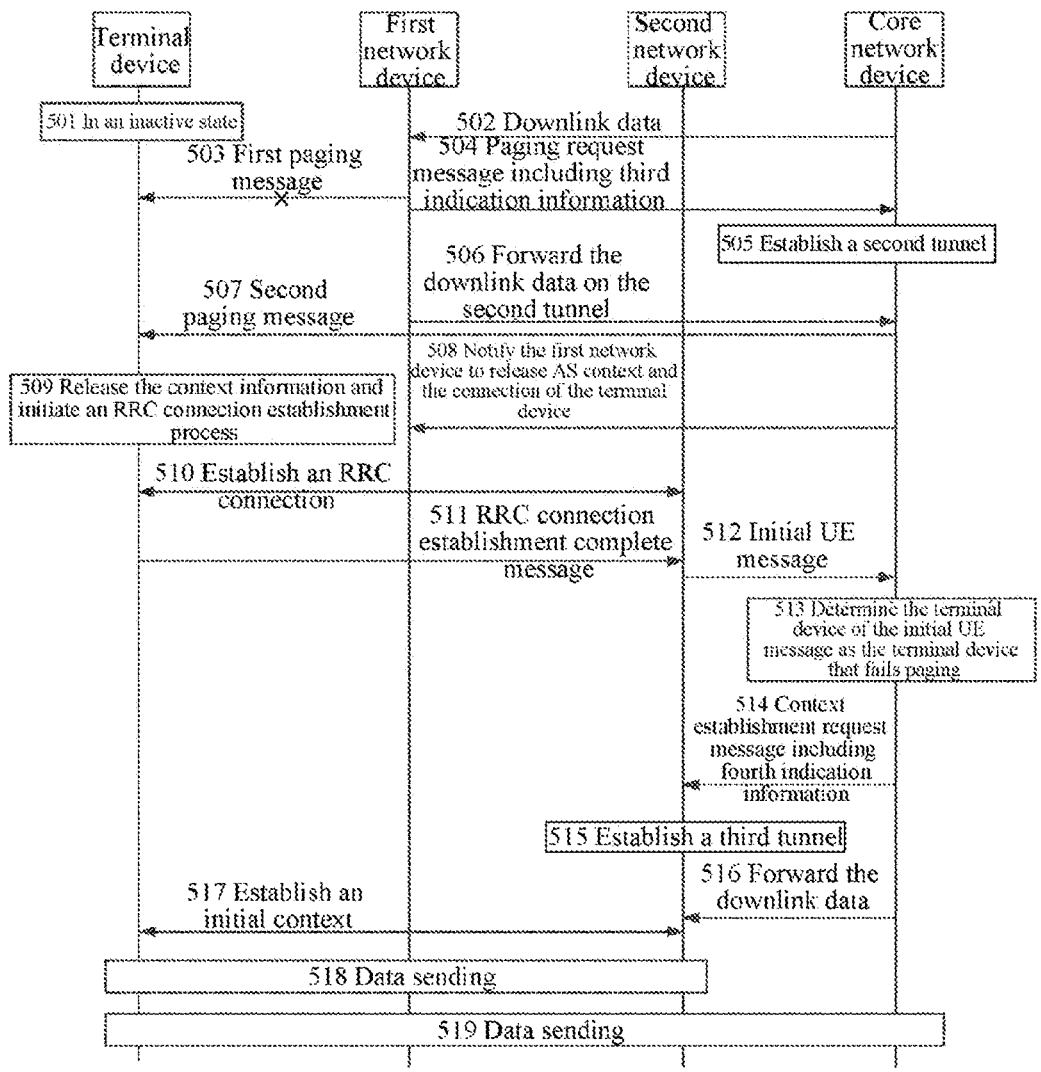
FIG. 5 is another flow chart of a method for transmitting data according to an embodiment of the present disclosure.

FIG. 5 is another schematic flowchart of a method for transmitting data according to an embodiment of the present disclosure.

Specifically, as shown in FIG. 5, the method includes the following steps.

In 501, the terminal device is in an activated state.

In 502, the core network device sends downlink data of the terminal device to the first network device.

In 503, the first network device fails to send the first paging message to the terminal device.

In 504, the first network device sends a paging request message including third indication information to the core network device, where the third indication information is used to indicate the core network device to establish the second tunnel. Further, the third indication information is further configured to instruct the core network device to reserve the first context information, and the communication connection of the terminal device between the first network device and the core network device.

In 505, the core network device establishes a second tunnel.

In 506, the first network device sends the downlink data to the core network device on the second tunnel.

In 507, the core network device sends a second paging message to the terminal device.

In 508, the core network device notifies the first network device to release an access stratum (AS) context of the terminal device and a connection of the terminal device.

In 509, the terminal device releases the context information and initiates an RRC connection establishment process.

In 510, an RRC connection is established between the terminal device and the second network device.

In 511, the terminal device sends an RRC connection establishment complete message to the second network device.

In 512, the second network device sends an initial UE message to the core network device.

In 513, the core network device determines that the terminal device of the initial UE message is a terminal device that fails paging.

In 514, the core network device sends a context establishment request message including fourth indication information to the second network device, where the fourth indication information is used to indicate the second network device to establish the third tunnel.

In 515, the second network device establishes a third tunnel.

In 516, the core network device sends the downlink data to the second network device on the third tunnel.

In 517, the second network device establishes an initial context of the terminal device.

In 518, data transmission is performed between the second network device and the terminal device.

In 519, data transmission is performed between the core network device and the terminal device.

In other words, when the INACTIVE UE has downlink data reaching the first network device, the first network device is triggered to initiate the paging message initiated by RAN. When the paging message initiated by the RAN fails to page the UE, the first network device initiates to the core network device a paging message request that initiates the initiation of the core network device with respect to the UE, instructs the core network device to temporarily save the connection of the UE on the NG/S1 and the request of the AS context, and requests the core network device to establish a GTP tunnel to the core network device for forwarding the downlink data of the UE at the first network device to the core network device side. The core network device establishes the GTP tunnel to the core network device for forwarding downlink data of the UE at the first network device to the core network device side. At the same time, the core network device also initiates a paging message for the UE. The first network device performs data forwarding. After the data forwarding ends, the core network device notifies the first network device to release the connection of the UE and context information. After receiving the paging message initiated by the core network device, the INACTIVE UE releases the UE AS context stored by the UE before, and initiates an RRC connection establishment process. When the core network device receives the initial UE message, and identifies that the current UE is the UE that is requested by the RAN to initiate the initial paging message of the core network device, it initiates a GTP tunnel establishment to the second network device in the initial context message, for the second network device to forward the downlink data of the UE. The core network device first forwards the data forwarded from the first network device, and then sends new data.

In another embodiment, when the first network device receives the downlink data sent by the core network device, and receives fifth indication information sent by the second network device, the first network device sends, via the second network device, the downlink data to the terminal device. The fifth indication information is used to indicate the second network device to establish a first tunnel, and the first tunnel is a tunnel used by the first network device to forward the downlink data to the second network device.

In other words, before the second network device receives the downlink data of the terminal device, the second network device sends the fifth indication information to the first network device.

For example, the second network device sends a context request message to the first network device, where the context request message is used to request the first context information, and the context request message includes the fifth indication information.

Optionally, the first network device receives notification information sent by the core network device, where the notification information is used to notify the first network device to release the first context information, and the communication connection of the terminal device between the first network device and the core network device.

Figure 6:
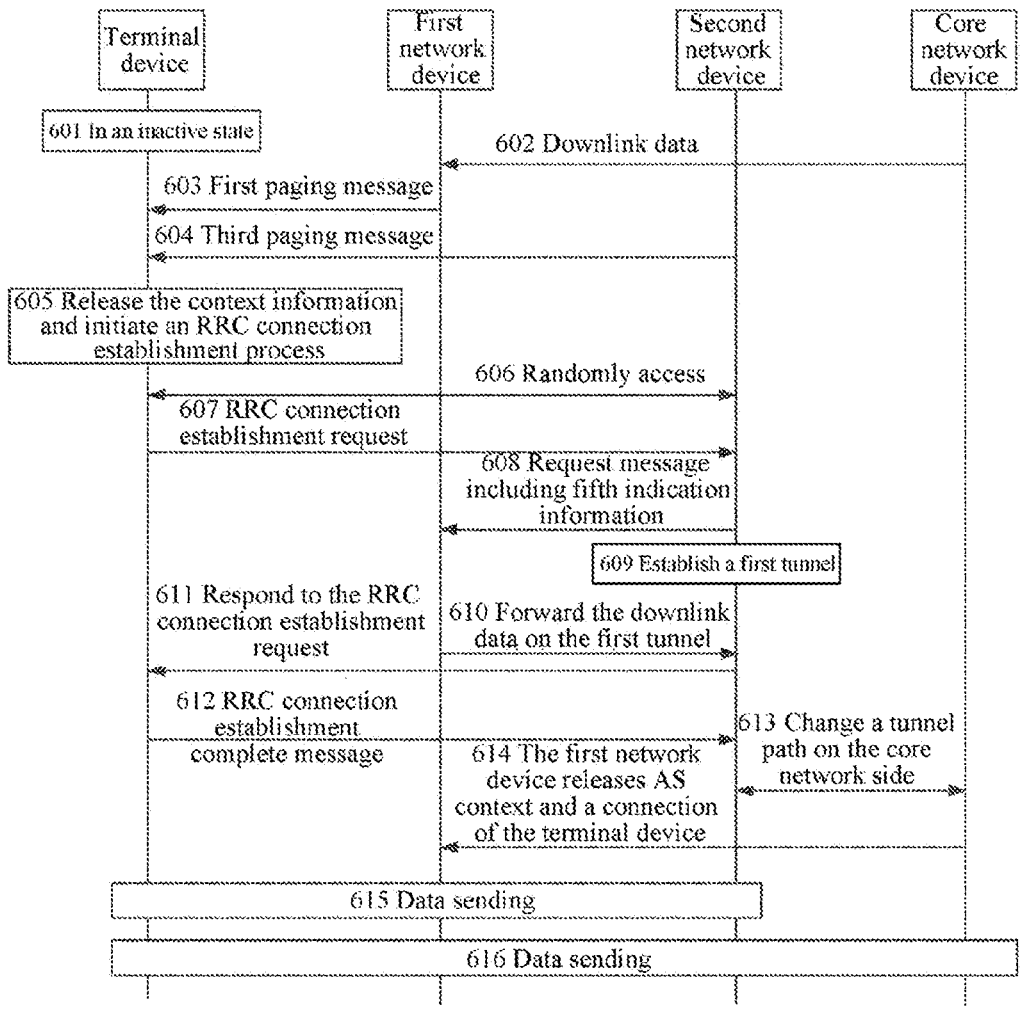
FIG. 6 is another flow chart of a method for transmitting data according to an embodiment of the present disclosure.

FIG. 6 is another schematic flowchart of a method for transmitting data according to an embodiment of the present disclosure.

Specifically, as shown in FIG. 6, the method includes the following steps.

In 601, the terminal device is in an activated state.

In 602, the core network device sends downlink data of the terminal device to the first network device.

In 603, the first network device sends a first paging message to the terminal device.

In 604, the second network device sends a third paging message to the terminal device.

In 605, the terminal device releases the context information and initiates an RRC connection establishment process.

In 606, the terminal device randomly accesses the second network device.

In 607, the terminal device sends an RRC connection establishment request to the second network device.

In 608, the second network device sends a request message including fifth indication information to the first network device, where the fifth indication information is used to indicate the second network device to establish a first tunnel for the first network device to forward the downlink data to the second network device.

In 609, the second network device establishes the first tunnel.

In 610, the first network device forwards the downlink data to the second network device on the first tunnel.

In 611, the second network device responds to the RRC connection establishment request sent by the terminal device.

In 612, the terminal device sends an RRC connection establishment complete message to the second network device.

In 613, a tunnel path on the core network side is changed.

In 614, the core network device notifies the first network device to release an access stratum (AS) context and a connection of the terminal device.

In 615, data transmission is performed between the second network device and the terminal device.

In 616, data transmission is performed between the core network device and the terminal device.

In other words, when the INACTIVE UE has downlink data reaching the first network device, the first network device is triggered to initiate a paging message initiated by the RAN. After receiving the paging initiated by the RAN, the UE initiates an RRC connection recovery process. After receiving the RRC recovery request of the UE, the second network device requests the first network device for context information, and in requesting the context request message, a GTP tunnel is established for the first network device to forward the downlink data of the UE to the second network device. The second network device changes the GTP tunnel path on the core network device side. The second network device first sends the data forwarded from the first network device, and then sends new data.

The network device according to the embodiments of the present disclosure will be described below with reference to FIG. 7 and FIG. 8.

Figure 7:
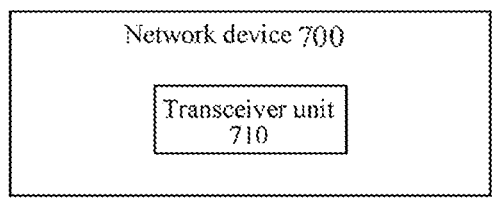
FIG. 7 is a schematic block diagram of a network device according to an embodiment of the present disclosure.

FIG. 7 is a schematic block diagram of a network device 700 according to an embodiment of the present disclosure.

Specifically, as shown in FIG. 7, the network device 700 includes a transceiver unit 710, which may be used to receive information sent by other network devices and terminal devices, and may also send information to other network devices and terminal devices.

In the embodiments of the present disclosure, by way of example and not limitation, the network device shown in FIG. 7 may be the first network device in the foregoing method embodiment, that is, the network device reserving the context information of the terminal device when the terminal device is in an inactive state.

Specifically, the transceiver unit 710 is configured to send downlink data of the terminal device to the terminal device via the second network device, where the terminal device is in an inactive state, the inactive state refers to that both the terminal device and the network device retain the context information of the terminal device, and a communication connection of the terminal device is reserved between the network device and the core network device, and the network device is different from the second network device.

Optionally, the transceiver unit 710 is specifically configured to:

when receiving the downlink data sent by the core network device, and failing to send the first paging message to the terminal device, send the downlink data to the terminal device via the second network device.

Optionally, the transceiver unit 710 is further configured to:

before the downlink data of the terminal device is sent to the terminal device via the second network device, forward the downlink data to the second network device by using the first tunnel, where the first tunnel is a tunnel established by the second network device from the network device to the second network device.

Optionally, the first tunnel is established by the second network device according to the identifier information of the network device and the first indication information sent by the core network device, where the first indication information is used to indicate the second network device to establish the first tunnel.

Optionally, the transceiver unit 710 is further configured to:

before forwarding the downlink data to the second network device by using the first tunnel, send, to the core network device, second indication information, where the second indication information is used by the core network device to reserve the first context information, and the communication connection of the terminal device between the network device and the above core network device.

Optionally, the transceiver unit 710 is specifically configured to:

send a paging request message to the core network device, where the paging request message is used to request the core network device to send a second paging message to the terminal device, and the paging request message includes the second indication information.

Optionally, the transceiver unit 710 is specifically configured to:

forward the downlink data to the core network device by using the second tunnel, so that the core network device forwards the downlink data to the second network device by using the third tunnel; where the second tunnel is a tunnel established by the core network device from the network device to the above core network device, and the third tunnel is a tunnel established by the second network device from the above core network device to the second network device.

Optionally, the second tunnel is established by the core network device according to third indication information sent by the network device, where the third indication information is used to indicate the core network device to establish the second tunnel.

Optionally, the third indication information is further used to indicate the core network device to retain the first context information, and the communication connection of the terminal device between the network device and the above core network device.

Optionally, the transceiver unit 710 is further configured to:

send the third indication information to the core network device before forwarding the downlink data to the core network device by using the second tunnel.

Optionally, the transceiver unit 710 is specifically configured to:

send a paging request message to the core network device, where the paging request message is used to request the core network device to send a second paging message to the terminal device, and the paging request message includes the third indication information.

Optionally, the third tunnel is established by the second network device according to fourth indication information sent by the core network device, where the fourth indication information is used to indicate the second network device to establish the third tunnel.

Optionally, the transceiver unit 710 is specifically configured to:

when receiving the downlink data sent by the core network device, and receiving the fifth indication information sent by the second network device, send, by the second network device, the downlink data to the terminal device, where the fifth indication information is used to indicate the second network device to establish a first tunnel for the network device to forward the downlink data to the second network device.

Optionally, the transceiver unit 710 is further configured to:

receive the context request message sent by the second network device before sending the downlink data of the terminal device to the terminal device via the second network device, where the context request message is used to request the first context information, and the context request message includes the fifth indication information.

Optionally, the transceiver unit 710 is further configured to:

receive the notification information sent by the core network device, where the notification information is used to notify the network device to release the first context information, and the communication connection of the terminal device between the network device and the core network device.

In the embodiments of the present disclosure, by way of example and not limitation, the network device shown in FIG. 7 may also be the second network device in the foregoing method embodiment, that is, the network device for sending downlink data to the terminal device when the terminal device is in an inactive state.

Specifically, the transceiver unit 710 is configured to receive downlink data of the terminal device, and send the downlink data to the terminal device, where the terminal device is in an inactive state, the inactive state refers to that the terminal device and the first network device both reserve context information of the terminal device, and a communication connection of the terminal device is reserved between the first network device and the core network device, and the first network device is different from the network device.

Optionally, the transceiver unit 710 is specifically configured to:

before receiving the downlink data of the terminal device, establish the first tunnel, where the first tunnel is a tunnel from the first network device to the network device, and the downlink data sent by the first network device is received by the first tunnel.

Optionally, the transceiver unit 710 is more specifically configured to:

receive the first indication information sent by the core network device, where the first indication information is used to indicate the network device to establish the first tunnel.

Optionally, the transceiver unit 710 is more specifically configured to:

receive a context establishment request message sent by the core network device, where the context establishment request message is used to request the network device to establish second context information of the terminal device, and the context establishment request message includes the first indication information.

Optionally, the transceiver unit 710 is specifically configured to:

before receiving the downlink data of the terminal device, establish a third tunnel, where the third tunnel is a tunnel from the core network device to the network device, and the downlink data sent by the core network device is received by the third tunnel.

Optionally, the transceiver unit 710 is further configured to:

before the third tunnel is established, receive fourth indication information sent by the core network device, where the fourth indication information is used to indicate the network device to establish the third tunnel.

The transceiver unit 710 is more specifically configured to:

receive a context establishment request message sent by the core network device, where the context establishment request message is used to request the network device to establish second context information of the terminal device, and the context establishment request message includes the fourth indication information.

Optionally, the transceiver unit 710 is further configured to:

before receiving the downlink data of the terminal device, send fifth indication information to the first network device, where the fifth indication information is used to indicate the network device to establish a tunnel for the first network device to forward the downlink data to the network device.

Optionally, the transceiver unit 710 is more specifically configured to:

send a context request message to the first network device, where the context request message is used to request the first context information, and the context request message includes the fifth indication information.

Optionally, the transceiver unit 710 is further configured to:

establish a radio resource control RRC connection between the network device and the terminal device with the terminal device.

In the embodiments of the present disclosure, by way of example and not limitation, the network device shown in FIG. 7 may also be the core network device in the foregoing method embodiment.

Specifically, the transceiver unit 710 is configured to forward the downlink data of the terminal device to the second network device by using the first network device, so that the second network device sends the downlink data to the terminal device, where the terminal device is in an inactive state, the inactive state means that the terminal device and the first network device both retain the context information of the terminal device, and the communication connection of the terminal device is retained between the first network device and the network device, and the first network device is different from the second network device.

Optionally, the transceiver unit 710 is further configured to:

before forwarding the downlink data of the terminal device to the second network device by the first network device, send the first indication information to the second network device, where the first indication information is used to indicate the second network device to establish a first tunnel, and the first tunnel is used by the first network device to forward the downlink data to the second network device.

Optionally, the transceiver unit 710 is further configured to:

receive second indication information sent by the first network device before forwarding the downlink data of the terminal device to the second network device via the first network device, where the second indication information is used to indicate the second network device to reserve the first context information, and the communication connection of the terminal device between the first network device and the network device.

Optionally, the transceiver unit 710 is specifically configured to:

receive by the network device the paging request message sent by the first network device, where the paging request message is used to request the network device to send a second paging message to the terminal device, and the paging request message includes the second indication information.

Optionally, the transceiver unit 710 is further configured to:

before forwarding the downlink data of the terminal device by the first network device to the second network device, establish a second tunnel, where the second tunnel is a tunnel from the first network device to the network device; and receive the downlink data sent by the first network device by using the second tunnel, so that the network device sends the downlink data to the second network device by using the third tunnel, where the third tunnel is a tunnel established by the second network device from the network device to the second network device.

Optionally, the transceiver unit 710 is further configured to:

before the second tunnel is established, receive the third indication information sent by the first network device, where the third indication information is used to indicate the network device to establish the second tunnel.

Optionally, the third indication information is further used to indicate the network device to reserve the first context information, and the communication connection of the terminal device between the first network device and the network device.

Optionally, the transceiver unit 710 is specifically configured to:

receive a paging request message sent by the first network device, where the paging request message is used to request the network device to send a second paging message to the terminal device, and the paging request message includes the third indication information.

Optionally, the transceiver unit 710 is further configured to:

before the third tunnel is established, send the fourth indication information to the second network device, where the fourth indication information is used to indicate the second network device to establish the third tunnel.

Optionally, the transceiver unit 710 is specifically configured to: send, by the network device, a context establishment request message to the second network device, where the context establishment request message is used to request the second network device to establish second context information of the terminal device, and the context establishment request message includes the fourth indication information.

Optionally, the transceiver unit 710 is further configured to:

send notification information to the first network device, where the notification information is used to notify the first network device to release the first context information and the communication connection of the terminal device between the first network device and the network device.

It should be noted that the transceiver unit 710 may be implemented by a transceiver. As shown in FIG. 8, the network device 800 may include a processor 810, a transceiver 820, and a memory 830. The memory 830 may be used to store indication information, and may also be used to store code, instructions, and the like executed by the processor 810. The various components in the network device 800 are connected by a bus system, and the bus system includes a power bus, a control bus, and a status signal bus in addition to a data bus.

Figure 8:
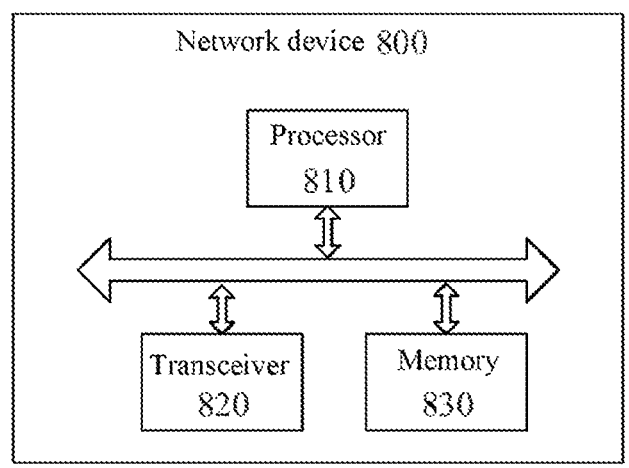
FIG. 8 is another schematic block diagram of a network device according to an embodiment of the present disclosure.

The network device 800 shown in FIG. 8 may implement the various processes implemented by the network device in the foregoing method embodiments of FIG. 2 to FIG. 6. To avoid repetition, details are not described herein again. That is to say, the method embodiments in the embodiments of the present disclosure may be applied to a processor or implemented by a processor.

In the implementation process, each step of the method embodiments in the embodiments of the present disclosure may be completed by an integrated logic circuit of hardware in the processor or an instruction in a form of software. More specifically, the steps of the method disclosed in the embodiments of the present disclosure may be directly implemented as being completed by a hardware decoding processor, or may be performed by a combination of hardware and software modules in the decoding processor. The software modules may be located in a mature storage medium in the art, such as a random access memory, a flash memory, a read only memory, a programmable read only memory or an electrically erasable programmable memory, a register, and the like. The storage medium is located in the memory, and the processor reads the information in the memory and combines the hardware to complete the steps of the above method.

The processor may be an integrated circuit chip with signal processing capability, and may implement or execute the methods, steps, and logic blocks disclosed in the embodiments of the present disclosure. For example, the above processor may be a general purpose processor, a digital signal processor (DSP), an application specific integrated circuit (ASIC), a field programmable gate array (FPGA), or other programmable logic devices, transistor logic devices, discrete hardware components, and the like. Further, the general purpose processor may be a microprocessor or the processor may be any conventional processor or the like.

Moreover, in the embodiments of the present disclosure, the memory may be a volatile memory or a non-volatile memory, or may include both volatile and non-volatile memories. The non-volatile memory may be a read-only memory (ROM), a programmable ROM (PROM), an erasable PROM (EPROM), or an electrical EPROM (EEPROM) or a flash memory. The volatile memory may be a random access memory (RAM) that acts as an external cache. It should be understood that the above memories are illustrative, instead of limitation. For example, the memory in the embodiments of the present disclosure may also be a static random access memory (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. That is, the memories of the systems and methods described herein are intended to include, but not limited to, these and any other suitable types of memory.

In the end, it is to be noted that the terminologies used in the embodiments and claims of the present disclosure are only for describing particular embodiments, rather than limiting the embodiments of the present disclosure.

For example, the singular forms "a", "said", and "the" used in the embodiments and claims of the present disclosure are also intended to include plural forms, unless the context clearly expresses other meanings.

For another example, the terms "first network device" and "second network device" may be employed in the embodiments of the present disclosure, but such network devices are not limited to these terms. These terms are only used to distinguish the network devices from each other.

Also for example, depending on the context, the expression "when . . . " as used herein may be interpreted as "in case" or "if" or "while" or "in response to determining" or "in response to detecting". Similarly, depending on the context, the phrase "if it is determined" or "if it is detected (stated condition or event)" may be interpreted as "when determining" or "in response to determining" or "when detecting (stated condition or event)" or "in response to detecting (stated condition or event)".

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraint conditions of the technical solution. A person skilled in the art can use different methods to implement the described functions for each specific application, but such implementation should not be considered to go beyond the scope of the embodiments of the present disclosure.

A person skilled in the art can clearly understand that for the convenience and brevity of the description, the specific working process of the system, the device and the unit described above can refer to the corresponding process in the foregoing method embodiments, and details are not described herein again.

In the several embodiments provided in the present application, it should be understood that the disclosed systems, devices, and methods may be implemented in other ways. For example, the device embodiments described above are only illustrative. For example, the division of the unit is only a logical function division. In actual implementation, there may be another division manner. For example, multiple units or components may be combined, or it may be integrated into another system, or some features may be ignored or not executed. In addition, the mutual coupling or direct coupling or communication connection shown or discussed may be an indirect coupling or communication connection through some interfaces, devices or units, and may be in an electrical, mechanical or other form.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, each functional unit in the embodiments of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a read-only memory, a random access memory, a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A method for transmitting data, applied in a terminal device in an inactive state, wherein the inactive state means that the terminal device and a first network device both reserve first context information of the terminal device, and a communication connection of the terminal device is reserved between the first network device and a core network device;
    wherein the method comprises:
        sending, by the first network device, downlink data of the terminal device to the terminal device via a second network device, the first network device being different from the second network device;
    wherein before sending, by the first network device, the downlink data of the terminal device to the terminal device via the second network device, the method further comprises:
        forwarding, by the first network device, the downlink data to the second network device via a first tunnel; and
    wherein the first tunnel is a tunnel established by the second network device from the first network device to the second network device;
    wherein before forwarding, by the first network device, the downlink data to the second network device via the first tunnel, the method further comprises:
        sending, by the first network device, second indication information to the core network device, wherein the second indication information is used by the core network device to reserve the first context information, and the communication connection of the terminal device between the first network device and the core network device;
    wherein the method further comprises:
        initiating, by the first network device, a UE connection release and context release process to the core network device, after the data forwarding is completed;
    wherein the second network device first sends the data forwarded from the first network device and then sends data transmitted from the core network device.

2. The method according to claim 1, wherein the sending, by the first network device, the downlink data of the terminal device to the terminal device via the second network device comprises:
    when the first network device receives the downlink data sent by the core network device and fails to send a first paging message to the terminal device, sending, by the first network device, the downlink data to the terminal device via the second network device.

3. The method according to claim 2, wherein:
    the first tunnel is established by the second network device according to identifier information of the first network device and first indication information that are sent by the core network device, and the first indication information is used to indicate the second network device to establish the first tunnel.

4. The method according to claim 2, wherein the sending, by the first network device, the second indication information to the core network device comprises:
    sending, by the first network device, a paging request message to the core network device, wherein the paging request message is used to request the core network device to send a second paging message to the terminal device, and the paging request message comprises the second indication information.

5. The method according to claim 2, wherein the sending, by the first network device, the downlink data of the terminal device to the terminal device via the second network device comprises:
    forwarding, by the first network device, the downlink data to the core network device by using a second tunnel, so that the core network device forwards the downlink data to the second network device by using a third tunnel;
    wherein the second tunnel is a tunnel established by the core network device from the first network device to the core network device, and the third tunnel is a tunnel established by the second network device from the core network device to the second network device.

6. The method according to claim 5, wherein:
    the second tunnel is established by the core network device according to third indication information sent by the first network device, and the third indication information is used to indicate the core network device to establish the second tunnel.

7. The method according to claim 6, wherein:
    the third indication information is further configured to indicate the core network device to reserve the first context information, and the communication connection of the terminal device between the first network device and the core network device.

8. The method according to claim 6, wherein before forwarding, by the first network device, the downlink data to the core network device via the second tunnel, the method further comprises:

sending, by the first network device, the third indication information to the core network device.

9. The method according to claim 8, wherein the sending, by the first network device, the third indication information to the core network device comprises:
sending, by the first network device, a paging request message to the core network device, wherein the paging request message is used to request the core network device to send a second paging message to the terminal device, and the paging request message comprises the third indication information.

10. The method according to claim 5, wherein:
the third tunnel is established by the second network device according to fourth indication information sent by the core network device, and the fourth indication information is used to indicate the second network device to establish the third tunnel.

11. A network device, comprising a processor, a transceiver, and a memory, wherein,
the processor, the transceiver, and the memory are connected with each other by a bus system, and the bus system comprises a power bus, a control bus, and a status signal bus in addition to a data bus, the memory is configured to store instructions, and the processor is configured to execute the instructions stored in the memory to cause the transceiver to:
send downlink data of a terminal device to the terminal device via a second network device, wherein the terminal device is in an inactive state, the inactive state means that the terminal device and the network device both reserve first context information of the terminal device, a communication connection of the terminal device is reserved between the network device and a core network device, and the network device is different from the second network device;
before sending the downlink data of the terminal device to the terminal device via the second network device, forward the downlink data to the second network device by using a first tunnel;
wherein the first tunnel is a tunnel established by the second network device from network device to the second network device;
before forwarding the downlink data to the second network device via the first tunnel, send second indication information to the core network device, wherein the second indication information is used by the core network device to reserve the first context information, and the communication connection of the terminal device between the network device and the core network device;
after the data forwarding is completed, initiate a UE connection release and context release process to the core network device;
wherein the second network device first sends the data forwarded from the first network device and then sends data transmitted from the core network device.

12. The network device according to claim 11, wherein the transceiver is further configured to:
after receiving the downlink data sent by the core network device, and receiving fifth indication information sent by the second network device, send the downlink data to the terminal device via the second network device, wherein the fifth indication information is used to indicate the second network device to establish a first tunnel for the network device to forward the downlink data to the second network device.

13. The network device according to claim 12, wherein the transceiver is further configured to:
before sending the downlink data of the terminal device to the terminal device via the second network device, receive a context request message sent by the second network device, wherein the context request message is used to request the first context information, and the context request message comprises the fifth indication information.

14. The network device according to claim 13, wherein the transceiver is further configured to:
receive notification information sent by the core network device, wherein the notification information is used to notify the network device to release the first context information, and the communication connection of the terminal device between the network device and the core network device.

15. A network device, comprising a processor, a transceiver, and a memory, wherein,
the processor, the transceiver, and the memory are connected with each other by a bus system, and the bus system comprises a power bus, a control bus, and a status signal bus in addition to a data bus, the memory is configured to store instructions, and the processor is configured to execute the instructions stored in the memory to cause the transceiver to:
receive downlink data of a terminal device, and send the downlink data to the terminal device;
wherein the terminal device is in an inactive state, the inactive state means that the terminal device and a first network device both reserve first context information of the terminal device, and a communication connection of the terminal device is reserved between the first network device and a core network device, and the first network device is different from the network device;
before receiving the downlink data of the terminal device, establish a first tunnel, wherein the first tunnel is a tunnel from the first network device to the network device; and
receive downlink data sent by the first network device by using the first tunnel;
wherein before receiving downlink data sent by the first network device by using the first tunnel, the first network device sends second indication information to the core network device, wherein the second indication information is used by the core network device to reserve the first context information, and the communication connection of the terminal device between the first network device and the core network device;
wherein after the data forwarding is completed, the first network device initiates a UE connection release and context release process to the core network device;
wherein the processor is further configured to execute the instructions stored in the memory to cause the transceiver to:
first send the data forwarded from the first network device and then send data transmitted from the core network device.

16. The network device according to claim 15, wherein the transceiver is further configured to:
receive first indication information sent by the core network device, wherein the first indication information is used to indicate the network device to establish the first tunnel.

17. The network device according to claim 16, wherein the transceiver is further configured to:

receive a context establishment request message sent by the core network device, wherein the context establishment request message is used to request the network device to establish second context information of the terminal device, and the context establishment request message comprises the first indication information.

* * * * *